United States Patent
Ting et al.

(10) Patent No.: US 8,689,136 B2
(45) Date of Patent: Apr. 1, 2014

(54) SYSTEM AND METHOD FOR BACKEND ADVERTISEMENT CONVERSION

(75) Inventors: Chyr-Chong Ting, San Jose, CA (US);
Partha Saha, Oakland, CA (US); Yang Yang, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 684 days.

(21) Appl. No.: 12/699,201

(22) Filed: Feb. 3, 2010

(65) Prior Publication Data
US 2011/0191714 A1 Aug. 4, 2011

(51) Int. Cl.
*G06F 3/048* (2013.01)

(52) U.S. Cl.
USPC .......................... 715/805; 709/223; 709/218

(58) Field of Classification Search
USPC ...................................................... 715/805
See application file for complete search history.

(56) References Cited

U.S. PATENT DOCUMENTS

| | | | |
|---|---|---|---|
| 6,311,194 B1 * | 10/2001 | Sheth et al. | 715/236 |
| 6,321,209 B1 * | 11/2001 | Pasquali | 705/14.73 |
| 6,393,479 B1 * | 5/2002 | Glommen et al. | 709/224 |
| 6,564,232 B1 * | 5/2003 | Cole et al. | 1/1 |
| 6,591,248 B1 * | 7/2003 | Nakamura et al. | 705/14.52 |
| 6,735,766 B1 * | 5/2004 | Chamberlain et al. | 717/173 |
| 6,904,408 B1 * | 6/2005 | McCarthy et al. | 705/2 |
| 6,925,442 B1 * | 8/2005 | Shapira et al. | 705/7.33 |
| 6,976,056 B1 * | 12/2005 | Kumar | 709/206 |
| 7,085,682 B1 * | 8/2006 | Heller et al. | 702/186 |
| 8,452,865 B1 * | 5/2013 | Heller et al. | 709/224 |
| 2001/0054086 A1 * | 12/2001 | Miyahira | 709/218 |
| 2003/0018885 A1 * | 1/2003 | Landsman et al. | 713/2 |
| 2005/0033641 A1 * | 2/2005 | Jha et al. | 705/14 |
| 2005/0097204 A1 * | 5/2005 | Horowitz et al. | 709/223 |
| 2005/0267913 A1 * | 12/2005 | Stienhans et al. | 707/200 |
| 2006/0294084 A1 * | 12/2006 | Patel et al. | 707/3 |
| 2007/0061195 A1 * | 3/2007 | Liu et al. | 705/14 |
| 2008/0275757 A1 * | 11/2008 | Sharma et al. | 705/10 |
| 2009/0024467 A1 * | 1/2009 | Fontoura et al. | 705/14 |

* cited by examiner

*Primary Examiner* — Phenuel Salomon
(74) *Attorney, Agent, or Firm* — Brinks Gilson & Lione

(57) ABSTRACT

A system for backend conversion attribution of an advertisement served to a user device. The advertisement server provides an advertisement to the user device. The advertisement server receives user information from the user device. The advertisement server stores attributable event information and the user information into an attributable event record in a data store. Based on a user event, a conversion server receives conversion information and the user information from the user device. The conversion server stores the conversion information and the user information into a conversion record in the data store. An attribution server matches the attributable event record with the conversion record.

21 Claims, 5 Drawing Sheets

SYSTEM AND METHOD FOR BACKEND ADVERTISEMENT CONVERSION

BACKGROUND

Traditionally, companies that serve web based advertisements generated revenue based on the number of times an advertisement is shown. Tracking the number of times an advertisement is served is a fairly straight forward process. However, this does not necessarily correspond to the value an advertiser receives for the money spent. As such, another method was developed that related revenue to the number of times that the advertisement was clicked. This system was more complex. However, the action of clicking was recognized at the time the advertisement was shown. Therefore, while tracking the click required additional processing, the clicking was closely tied to the advertisement and could be easily accommodated due to the sequential and synchronous nature.

More recently, it has been recognized that advertisements that do not immediately produce a click, still may have additional value as user may still see the advertisement and visit the advertiser's website at a later time. Further, advertisements that are clicked on still only loosely correspond to the value received by the advertiser. For example, a click on an advertisement does not necessarily mean that the user will purchase anything from the user.

Accordingly it can be seen that there is a need for an improved system and method for attributing conversion events to advertisements.

SUMMARY

In satisfying the drawbacks and other limitations of the related art, the present application provides a system and method for backend advertisement conversion.

The system may include an advertisement server, a conversion server, an attribution server, and a data store. The advertisement server provides an advertisement to the user device. The advertisement server receives user information from the user device. The advertisement server stores attributable event information and the user information into an attributable event record in a data store. Based on a user event, a conversion server receives conversion information and the user information from the user device. The conversion server stores the conversion information and the user information into a conversion record in the data store. An attribution server matches the attributable event record with the conversion record.

Further objects, features and advantages of this application will become readily apparent to persons skilled in the art after a review of the following description, with reference to the drawings and claims that are appended to and form a part of this specification.

DETAILED DESCRIPTION

Figure 1:
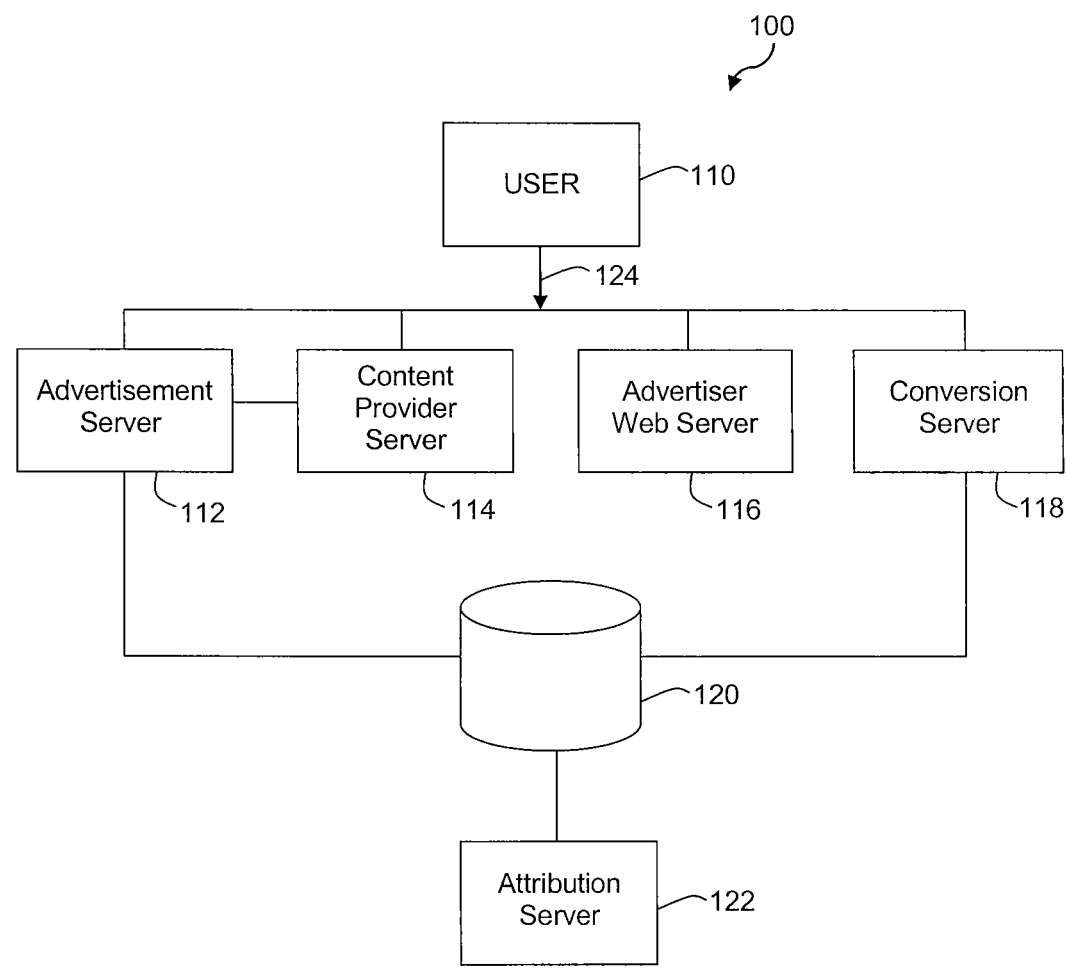
FIG. 1 is a schematic view of system for backend advertisement conversion according to one embodiment of the present application.

To more closely correlate the cost of an advisement with the value received by the advertiser, systems can relate an event (attributable event) such as the showing of an advertisement (an impression) with an action later taken by the user (a conversion). An attributable event may be, for example, impression, click, interaction with ad (mouse over a particular part of the ad), etc. Each prior event can have an associated value assigned by the system using a mathematical model. The conversion may, for example, take the form of visiting the advertiser's web page, signing up for a promotion, or purchasing an item. The conversion event can be matched to single or multiple attributable events (e.g. user actions occurring prior to the conversion event). The advertiser may include a pixel (a small routine) on their page that is run when the conversion event occurs. The pixel may notify the system that the conversion event has occurred. Once the system has received notification of the conversion event, the conversion event may be paired with an attributable event, such as an impression (a particular serving/display of an advertisement) that may have attributed to the conversion. The matching of the conversion event to the impression is called attribution.

One way of tracking conversions is to store the user and attributable event information in a cookie on the user's system. In this scenario, the cookie could be read at the time of conversion by the advertisement server to perform attribution. However, storing the attributable event information in a cookie has certain disadvantages. The size of the cookie is one concern. If the attributable event is tracked over a 30 day period or longer, the cookie size may become quite substantial. In addition, the information in the cookie would need to be accessed and transferred to the advertisement server in real time during the conversion event. This may cause slow response times and affect the user experience. In addition, roughly 40% of users clear cookies stored on their system within a month. Further, this scenario is limited in architecture, such that the advertisement server would need to be involved in both the attributable event and conversion. The advertisement server would write to the cookie when the advertisement is served. Because of domain access restrictions, the advertisement server would also need to access the cookie during attribution. The domain that writes the cookie is the only domain that can retrieve the cookie. One way to avoid issues associate with storing the attributable event information in a cookie is to track the attributable event information using a back end system with a data store.

This also facilitates high value attributions. For example, it takes much longer for a user to make a decision on a bigger purchase. A user would typically take more time to decide to buy a house or a car than a cup of coffee. Therefore, a longer look back period would be required. If this data is stored in a cookie, the system would need to transfer a significant amount of data, thereby slowing the response time and degrading the user experience.

One example is provided in the system 100 of FIG. 1. The user device 110 is operated by a consumer to access information, for example, browsing web content over the internet 124. The web content may be accessed by a web browser, for example INTERNET EXPLORER, FIREFOX, or other similar web browser. Alternatively, the web content may be accessed by an application specific software program, for example, AMERICA ONLINE, or other custom applications. Further, the user device 110 may be any web enabled device including a computer, PDA, mobile phone, or similar electronic device.

The user device 110 may access the content server 114 over an internet connection 124. The content server 114 may provide information about a specific subject and include advertisements related to that subject. For example, a web page that has information about vehicles may indicate that the user may be a good candidate to see an advertisement about vehicles. As such, the content server 114 may include a module in the web page retrieved by the user device 110 that displays an advertisement. The user device 110 downloads content from the content server 114 often in the form of a web page. The web page may be written in HTML. Alternatively, the page may be generated based on input from the user device 110. When the web page is generated by the content server 114, a routine is run on the server that retrieves and formats information based on the user input. This is called server side software because the routine is run by the server. One example is a search engine where the user query is used to identify a list of web pages that match the query. The list may then be formatted in HTML and provided to the browser for display to the user. The web page may also include software that is to be run on the user device 110. The software that runs on the user device 110 is called client side software, for example JAVA or ASP.

The web page displayed on the user device 110 may request an advertisement from an advertisement server 112 over the Internet connection 124. The advertisement server 112 may provide the advertisement to the user device 110 over the Internet connection 124. Further, the advertisement server 112 may request user information from the user device 110. The user information may include a user identification (user ID). The user information may be stored on the user device 110 as a cookie. The user ID can be the Yahoo user ID, a generated ID, the user IP address, the mac address, browser version, screen resolution, language setting, or a combination of some or all of the aforementioned data.

Additionally, the user information may be provided to the advertisement server 112 over the Internet connection 124. As such, the advertisement server 112 may store the user information into a data store 120. The advertisement server may store the user information along with attributable event information corresponding to the advertisement served to the user device 110. In one example, the user information and attributable event information may be stored in an attributable event record. The attributable event information may include the advertiser, the product being advertised, a particular advertisement identification, an advertisement campaign, an advertisement campaign identification, a discount or special offer information, or other similar advertisement information. The user information and/or the attributable event information may be indexed in the data store 120 by the user ID. In another implementation, the user information and/or the attributable event information may be indexed in the data store 120 by a time stamp. The data store 120 may be a database that is stored on one or more storage devices (e.g. hard drives, optical drives, static memory, raid arrays, etc.). For example, the data store 120 may be a relational database, a hierarchical database, an object oriented database, or a flat file format. Further, the data store 120 may be a database that is stored in a backend server remote from the user device 110. The data store 120 may be an indexed file (such as Tfile format). The data store 120 is separate and independent from a cookie stored on the user device. Further, the data store may be controlled by the entity that owns the advertisement server and stored on hardware of that entity. Accordingly, the data store may be located in a hosted environment, for example on a server accessed through backend network separate from the internet.

Subsequently, the user may take certain actions based on the advertisement that was served by the advertisement server 112. Such actions may include, clicking on an advertisement, visiting a web page, filing a web form (e.g., taking a survey, joining an email list, etc.), or other similar event. In one example, the user may utilize the user device 110 to connect to an advertiser web server 116 over the Internet connection 124. As such, the user device 110 may request a web page from the advertiser web server 116. In a particular implementation, the user may purchase an item through a web based store front provided to the user device 110 by the advertisement web server 116 over the Internet connection 124. The purchase may be performed for example, by clicking a button on the web page displayed on the user device 110. This action may be construed as a conversion event. Accordingly, the advertiser web server 116 may download a pixel to the user device 110 that is processed with the web page. A pixel may be a client side routine that is triggered when the conversion event happens. By way of example, the conversion may be clicking on an advertisement, filling in a form, pushing a button, visiting a web page or other similar events.

In the scenario discussed, the pixel may be triggered when the button is clicked for purchasing the item, or alternatively after the page returns a credit card authorization. The client side routine on the user device 110 would contact a conversion server 118 over the Internet connection 124. As such, the user device 110 may provide user information (e.g., user ID) along with conversion information to the conversion server 118 over the Internet connection 124. The conversion information may include the advertiser, the product being purchased, the price of the product, any discount or special offer in the case of the purchase conversion event. Alternately, the conversion information may include the type of conversion event (e.g., visiting a web page, purchasing an item, filling in a form, etc.) and related information to the particular conversion type.

The conversion server 118 stores the user information and/or the conversion information into the data store 120. For example, the conversion server may store the conversion information together with the user information in a conversion record. The user information, for example the user ID, may be retrieved from a cookie on the user system. If the user information is not stored in the cookie or the cookie has been deleted, the user information may be generated and may be stored in a cookie on the user device 110. In one implementation, the conversion information may be indexed by the user information. Alternatively, the user information and conversion information may be stored based on a time stamp.

This architecture allows one data path for attributable event information being provided to the data store 120 through the advertisement server 112, and a second separate data path for the conversion information being provided to the data store 120 through the conversion server 118. Further, in this implementation, the content provider server, the advertisement server, the advertiser's web server, and the conversion server may all have different domains and operate independently. As a result, the attributable event information and conversion information are both stored in the data store 120. Accordingly, the conversion information still has to be matched with the attributable event information to attribute a particular attributable event to the conversion event. As such, a separate attribution server 122 may be provided. The attribution server 122 independently and asynchronously matches the conversion information to the attributable event information. Very large amounts of data need to be analyzed in order to match conversion events to the attributable event provided to the particular user. Accordingly, the attribution server 122 may be implemented on a distributed computing platform such as a grid computing system.

For example, the conversion attribution may be performed on a grid computing system in a Hadoop environment. In this information age, data is essential for understanding customer behaviors and for making business decisions. The amount of data collected may be in the scale of terabytes or peta bytes. As such, there is a huge challenge in processing such a large amount of data on a daily basis.

Developers can leverage a parallel computing system for the processing of large data applications. Hadoop is an open-source, java-based, high performance parallel computing infrastructure that utilizes thousands of commodity PCs to produce significant amount of computing power. Map/reduce is the common program style used for code development in the Hadoop system. However, non-map/reduce programs may also be used. It is also a software framework introduced by GOGGLE, Inc. to support parallel computing over large data sets on clusters of computers.

Based on the described architecture using a back end data system, different domains may share the same user information, advertisement information, and/or conversion information. The attributable event information is provided to the data store through a separate path than the conversion information. Further, at the same time the advertisement server may have a different domain than the conversion server. This allows business logic to be implemented separately on heterogeneous advertisement and conversion systems. While many processes may be implemented for matching the conversion information to the attributable event information, particular implementations are discussed in more detail later.

Figure 2:
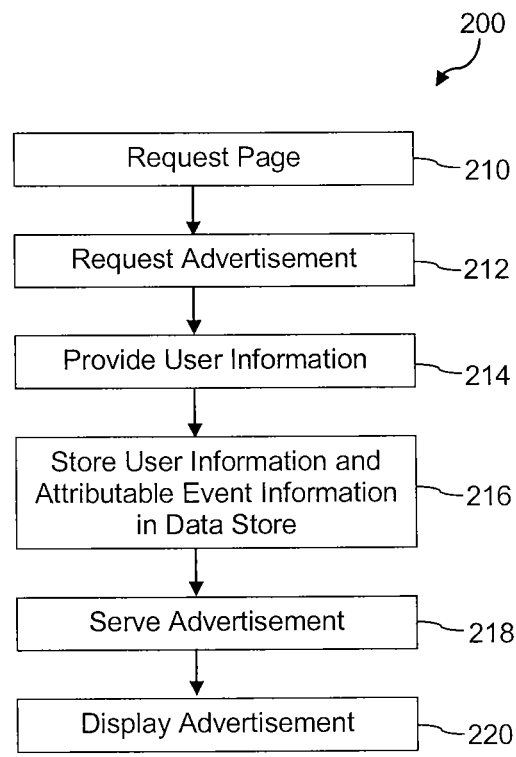
FIG. 2 is a flowchart illustrating a method of serving an advertisement.

Now referring to FIG. 2, a method 200 is provided for serving an advertisement. In block 210, a web page is requested. For example, a user device may request a web page from a content provider. In block 212, an advertisement may be requested. For example, the web page may include client side code to request an advertisement from an advertisement server. User information may then be provided as denoted by block 214. For example, the user device may then provide user information to the advertisement server. The user information and the attributable event information may be stored in a data store as denoted by block 216. For example, the advertisement server may receive the user information, such as a user ID, from the user device and match the user ID with attributable event information. Further, the advertisement server may store the attributable event information along with the user information in a data store. An advertisement may then be served to the user as denoted by block 218. In block 220, the advertisement may be displayed to the user. For example, the advertisement server may provide the advertisement to the user device and the user device may display the advertisement to the user.

Figure 3:
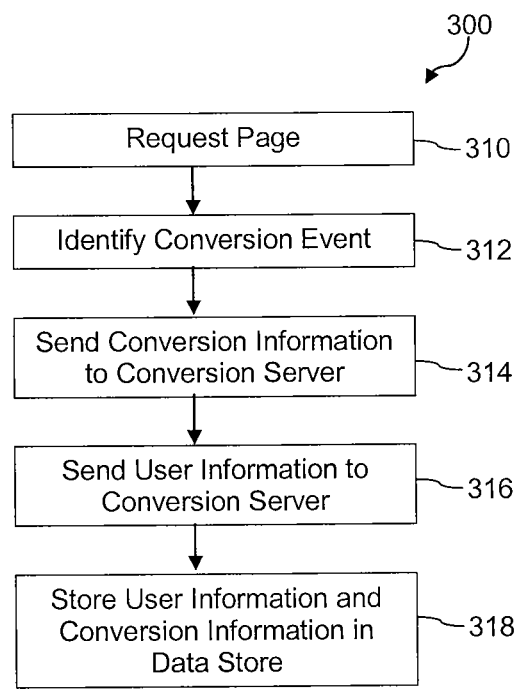
FIG. 3 is a flowchart illustrating a method of converting an advertisement.

Now referring to FIG. 3, a method 300 of converting an advertisement is provided. In block 310, a web page is requested. A conversion event is then identified, as denoted by block 312. The conversion event may be identified by a pixel, such as client side code that is downloaded to the user device when the web page was requested. The conversion event may be triggered by visiting the web page, filling in a form, purchasing an item, or other similar event. Conversion information is then sent to the conversion server as denoted by block 314. For example, the client side code when triggered could send information identifying the type of conversion event including information related to the conversion event to a conversion server. For example, if the conversion event is a purchase, the conversion information may include the item purchased, the price, any special offer, or other similar information.

In another example, if the conversion event is filling out a form, the form information may be provided within the conversion information. In block 316, user information is also sent to the conversion server. The user information may include a user ID that can later be used to link the conversion event to attributable event information for advertisements that were previously served to the user. The user information and the conversion information may be stored in the data store, as denoted by block 318. For example, the conversion server may store the user information and conversion information on the data store into time coded buckets or simply stored by time stamp. Accordingly, the conversion information may be matched to attributable event information in an asynchronous method performed by an independent system that has access to the data store.

Figure 4:
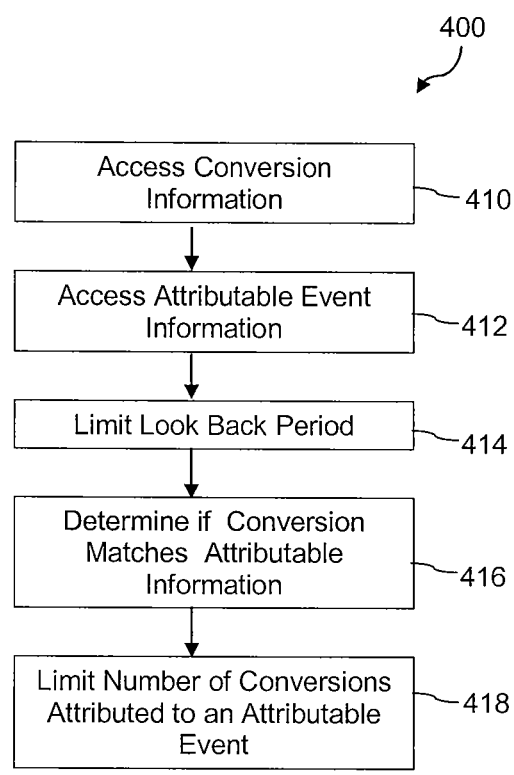
FIG. 4 is a flowchart illustrating a method of attributing a conversion to an attributable event.

Now referring to FIG. 4, a method 400 of attributing a conversion to an attributable event of an advertisement is provided. In block 410, conversion information is accessed, for example by an attribution server. Attributable event information is then accessed, as denoted by block 412. As such, the attribution server may match the conversion information to the attributable event information based on the various parameters such as the user information, a look back period, and a maximum number of conversions per attributable event. In block 414, the look back period is limited. For example, the attribution server may access the conversion information and limit its analysis for determining a matching attributable event to a specific time period prior to the time of the conversion event. Within the given look back period, it is determined if the conversion matches each record of attributable event information. In block 416, the attribution server may match the conversion information to the attributable event information based on the user information, for example based on the user ID. Further, the number of conversions attributed to a particular attributable event is limited to a maximum number, as denoted by block 418. Accordingly, even if it is determined that a conversion matches the correct criteria for an attributable event, only a maximum number of conversions may be attributed to a particular attributable event.

The conversion information may be matched to the attributable event information based on an advertisement identification, the user identification, the advertiser, the product, the advertisement campaign, or other similar information. Further, the conversion information may be matched to the attributable event information based on a combination of the user information, the attributable event information, and/or the conversion information.

The method for serving the advertisement, the method for converting an advertisement, and the method of attributing the conversion to an advertisement may all happen independently, for example by different servers, processors, or threads. Further, these methods may be performed asynchronously and/or simultaneously.

Figure 5:
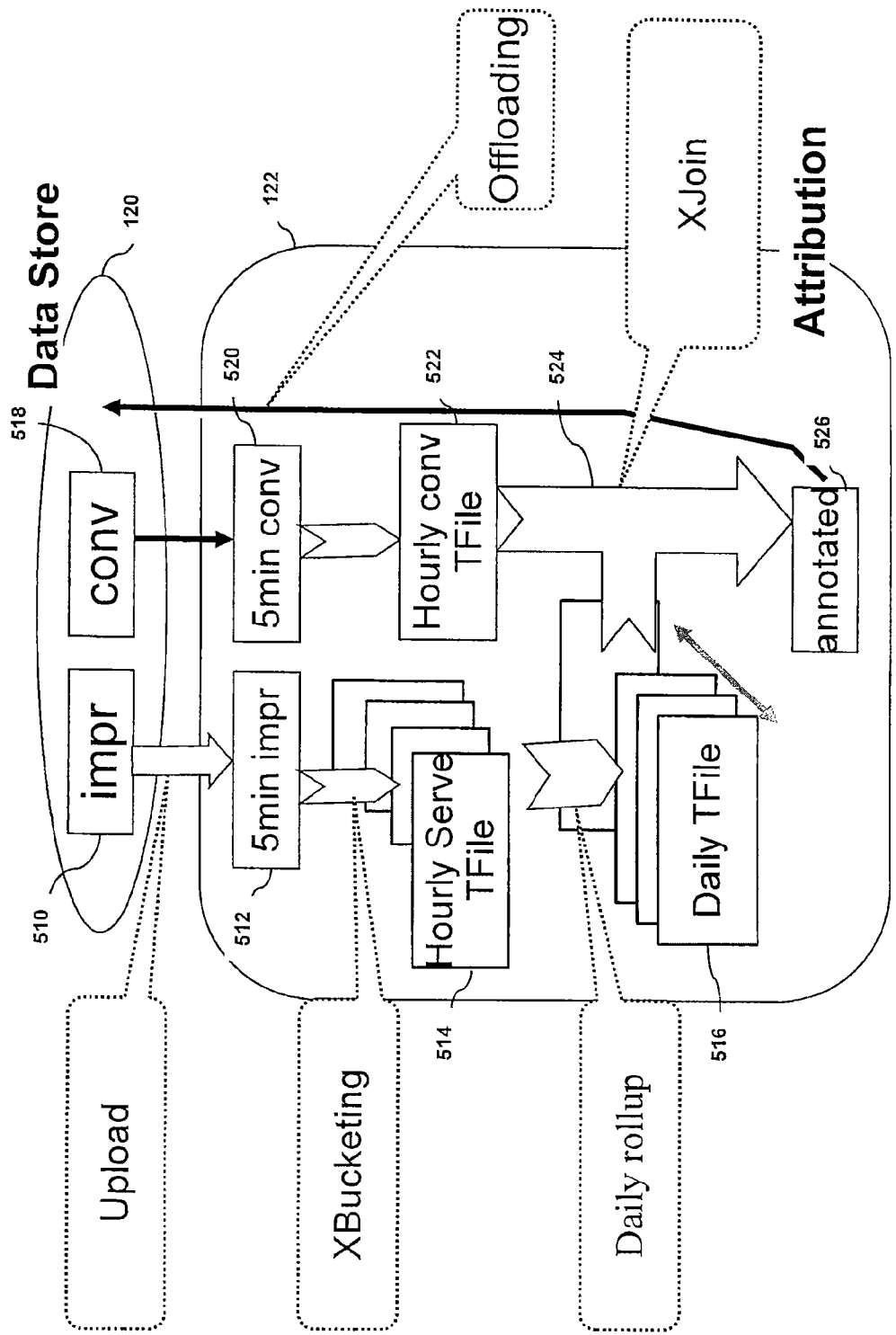
FIG. 5 is a block diagram illustrating one implementation of an attribution server.

One implementation of the attribution server is provided in FIG. 5. The data store 120 includes attributable event records 510 and conversion records 518 that may be accessed by the attribution server 122. The attribution server may be implemented on a grid computing system, for example in a Hadoop environment. As denoted by block 512, the incoming attributable event records 510 from the data store 120 are ordered and bucketed according to timestamp. This may occur independently and asynchronously with both the advertisement serving and the conversion identification. The attributable event records 510 may be retrieved from the data store 120 at predetermined time intervals, for example every 5 minutes. Similarly, the conversion records 518 may be retrieved by the attribution server 122 from the data store 120 at predetermined time intervals, for example every 5 minutes. However, the raw conversion information cannot be joined with the attributable event information by timestamp because when the conversion happens, the system does not know when in the past any related attributable events could have served. Therefore, the conversion events may be matched to the attributable event information by joining the attributable event records to the conversion records based on the user information, such as the user ID. Accordingly, the records are reorganized according to the user ID, into user ID-based buckets as denoted by block 514, this is called "xbucketing".

Xbucketing is further broken into two steps. First every hour, the xbucketing process is performed. The process parses the attributable event records using a custom schema, which recognizes the attributable event records format but may, for example, be specified in XML. Second, all the hourly buckets from the past day are combined into a daily file as denoted by block 516. The daily file does not need parsing because the user ID is already parsed out in the hourly process, and recorded in the hourly files. The above hourly xbucketing process is done for both attributable event events as well as conversion events as denoted by block 522. The join process is then performed according to a predetermined time period. For example, every hour, the hourly conversion events are joined with the attributable event information in the daily file using a join key. The join process may use the user information as a join key to look into the daily buckets of attributable event information, as denoted by reference numeral 524. In one example, the User ID may be used as the join key. The process may look across a predetermined time period called the look back period. For example, the process may look for attributable event information with a matching user ID within the past 30 days and/or the past hours in the current day. The hit records are fed to a business module in memory, which annotates the conversion record, as denoted by reference numeral 526. The annotation indicates attribution of the conversion to a specific attributable event. Further, the process may limit the number of conversions attributed to an attributable event. Further, the process may limit the number of a particular type of conversion attributed to a particular user ID. For example, the system may only track the first time a particular user fills out a particular form. The attribution server may then produce a list of annotated conversion events. The output from join is given to a grid-offloading job, which updates the data store 120 and generates an attribution report.

Figure 6:
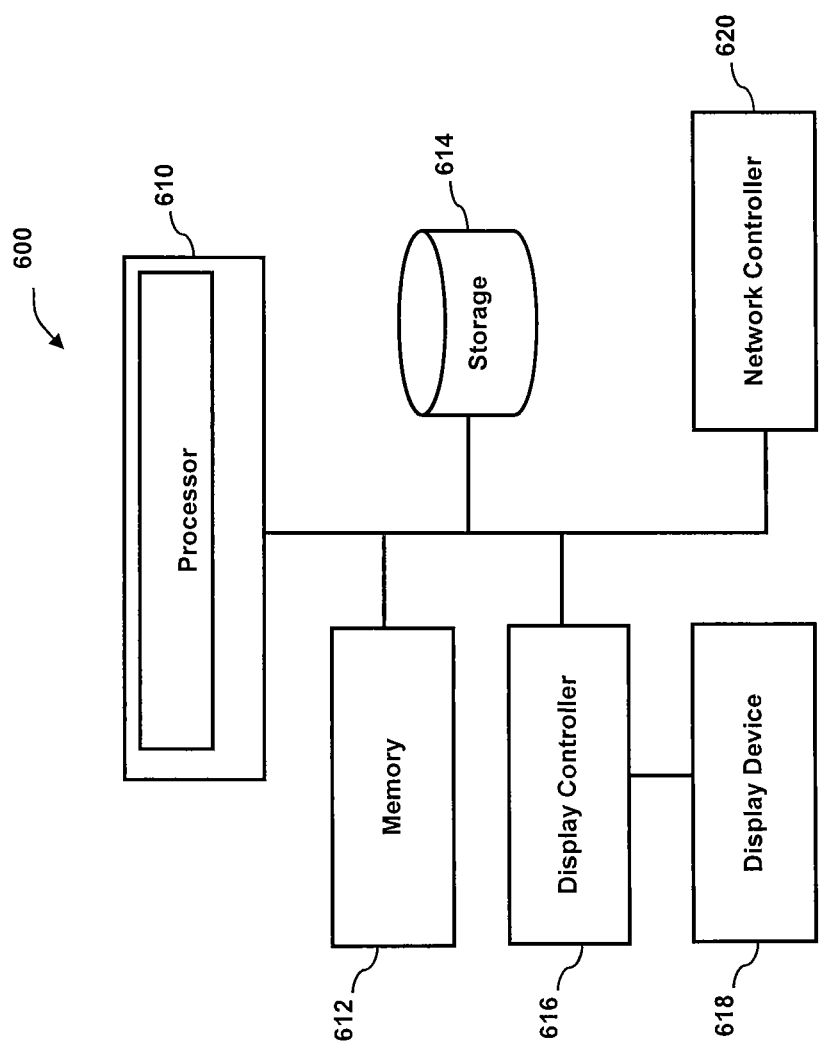
FIG. 6 is a schematic view of a computer system for implementing the methods described herein.

Any of the modules, servers, or engines described may be implemented with one or more computer systems. If implemented in multiple computer systems the code may be distributed and interface via application programming interfaces. Further, each method may be implemented on one or more computers. One exemplary computer system is provided in FIG. 6. The computer system 600 includes a processor 610 for executing instructions such as those described in the methods discussed above. The instructions may be stored in a computer readable medium such as memory 612 or a storage device 614, for example a disk drive, CD, or DVD. The computer may include a display controller 616 responsive to instructions to generate a textual or graphical display on a display device 618, for example a computer monitor. In addition, the processor 610 may communicate with a network controller 620 to communicate data or instructions to other systems, for example other general computer systems. The network controller 620 may communicate over Ethernet or other known protocols to distribute processing or provide remote access to information over a variety of network topologies, including local area networks, wide area networks, the internet, or other commonly used network topologies.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this application. This description is not intended to limit the scope or application of the claim in that the invention is susceptible to modification, variation and change, without departing from spirit of this application, as defined in the following claims.

We claim:

1. A system for backend conversion attribution of an advertisement served to a user device comprising:
   an advertisement server in communication with the user device, the advertisement server providing the advertisement to the user device based on an advertisement request, the advertisement server storing attributable event information and user information into an attributable event record in a data store;
   a conversion server in communication with the user device, the conversion server receiving conversion information and the user information, the conversion server storing the conversion information and the user information into a conversion record in the data store; and
   an attribution server in communication with the data store, wherein the attribution server matches the attributable event record with the conversion record and the attribution server only matches the conversion record to attributable event records that occurred within a predefined time period.

2. The system according to claim 1, wherein the attribution server operates asynchronously with respect to the advertisement server and conversion server.

3. The system according to claim 2, wherein the conversion server operates asynchronously with respect to the advertisement server.

4. The system according to claim 1, wherein the advertisement server and the conversion server provide independent data paths for the attributable event information and the conversion information to the attribution server.

5. The system according to claim 4, wherein the advertisement server has a first domain and the conversion server has a second domain, wherein the first domain is different from the second domain.

6. The system according to claim 1, wherein the attribution server matches the attributable event record to the conversion record based on a user ID contained the user information.

7. The system according to claim 6, wherein the user ID is based on one or more of a user IP address, a mac address, a browser version, a screen resolution.

8. The system according to claim 1, wherein the attribution server limits the number of times an attributable event record can be matched with a conversion to a predetermined number.

9. The system according to claim 1, wherein the attribution server calculates an attribution report.

10. The system according to claim 1, wherein the attribution server is implemented on a grid computing network.

11. The system according to claim 1, wherein the conversion event is an event from a group consisting of purchasing a product, filling in a web form, requesting a web page.

12. The system according to claim 1, wherein the conversion information includes one or more of an advertiser identification, a product identification, a purchase price, a discount indicator.

13. A non-transitory computer readable medium having stored therein instructions executable by a programmed processor for backend conversion attribution of an advertisement to a conversion event, the computer readable medium comprising instructions for:
retrieving attributable event records from a backend data store;
retrieving conversion records from the backend data store; and
matching the conversion records to the attributable event records based on user information stored in the conversion records; wherein the matching happens asynchronously with the conversion event and the conversion record is matched to attributable event records that occurred only within a predefined time period.

14. The computer readable medium according to claim 13, wherein an attributable event record can be matched with a conversion record only a predetermined number of times.

15. The computer readable medium according to claim 13, wherein a particular type of conversion can be matched only a predetermined number of times for a particular user ID.

16. The computer readable medium according to claim 13, further comprising instructions for bucketing the attributable event records into daily files.

17. The computer readable medium according to claim 13, further comprising instructions for joining attributable event records with the conversion records based on a user identification.

18. A method for backend conversion attribution of an advertisement to a conversion event, the method comprising:
retrieving attributable event records from a backend data store;
retrieving conversion records from the backend data store; and
matching the conversion records to the attributable event records based on user information stored in the conversion records; wherein the matching happens asynchronously with the conversion event, wherein an attributable event record can be matched with a conversion record only a predetermined number of times; and
joining attributable event records with the conversion records based on a user identification.

19. The method according to claim 18, wherein the conversion record is matched to attributable event records that occurred only within a predefined time period.

20. The method according to claim 18, wherein particular type of conversion record can be matched only a predetermined number of times for a particular user ID.

21. The method according to claim 18, further comprising bucketing the attributable event records into daily files.

* * * * *